(12) United States Patent
Arvapally et al.

(10) Patent No.: US 10,319,042 B2
(45) Date of Patent: Jun. 11, 2019

(54) COMPUTERIZED-METHODS AND SYSTEMS FOR IDENTIFYING DUPLICATE ENTRIES IN A DATABASE OF MERCHANT DATA

(71) Applicant: MASTERCARD INTERNATIONAL INCORPORATED, Purchase, NY (US)

(72) Inventors: Ravi Santosh Arvapally, O'Fallon, MO (US); Peng Yang, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 596 days.

(21) Appl. No.: 14/887,512

(22) Filed: Oct. 20, 2015

(65) Prior Publication Data

US 2017/0109831 A1 Apr. 20, 2017

(51) Int. Cl.
*G06Q 40/00* (2012.01)

(52) U.S. Cl.
CPC ..................... *G06Q 40/12* (2013.12)

(58) Field of Classification Search
CPC ....................................................... G06Q 40/12
USPC .... 705/7.29, 39, 44, 30, 14.23, 14.53, 14.47
See application file for complete search history.

(56) References Cited

U.S. PATENT DOCUMENTS

| | | | | |
|---|---|---|---|---|
| 2002/0095357 A1* | 7/2002 | Hunter | ............... | G06Q 10/0637 705/7.36 |
| 2009/0187466 A1* | 7/2009 | Carter | .................... | G06Q 30/02 705/7.34 |
| 2010/0250364 A1* | 9/2010 | Song | ....................... | G06F 21/33 705/14.47 |
| 2011/0137928 A1* | 6/2011 | Engle | ................... | G06Q 40/123 707/769 |
| 2012/0290389 A1* | 11/2012 | Greenough | ........ | G06Q 30/0261 705/14.53 |
| 2013/0191223 A1* | 7/2013 | Harris | ............... | G06F 16/24575 705/14.66 |
| 2014/0094194 A1* | 4/2014 | Schwent | ............. | G06F 16/9537 455/456.3 |
| 2014/0344040 A1* | 11/2014 | Howe | ................ | G06Q 30/0222 705/14.23 |
| 2015/0106244 A1* | 4/2015 | Lo Faro | ................. | G06Q 40/12 705/30 |

(Continued)

*Primary Examiner* — Olusegun Goyea
(74) *Attorney, Agent, or Firm* — Harness, Dickey & Pierce, P.L.C.

(57) ABSTRACT

Systems and methods are provided for verifying and/or confirming merchant data for multiple different transactions. One method generally includes accessing merchant data for a merchant where the merchant data includes a master merchant identifier for the merchant, and querying, by a computing device, multiple users as to which of a list of merchant data entries, for multiple different transactions and including different merchant identifiers, corresponds to the master merchant identifier for the merchant. The users are associated with a location within a predefined distance of the confirmed merchant and/or have performed one or more purchase transactions at the merchant. The method also generally includes receiving, at the computing device, a response from at least one of the users, in which the at least one of the users selects a data entry from the list, and determining whether to proceed in querying additional users.

13 Claims, 4 Drawing Sheets

(56) References Cited

U.S. PATENT DOCUMENTS

| | | | |
|---|---|---|---|
| 2015/0161603 A1* | 6/2015 | Fish | G06O 20/40 |
| | | | 705/44 |
| 2015/0309988 A1* | 10/2015 | Allen | G06F 16/335 |
| | | | 704/9 |
| 2016/0098790 A1* | 4/2016 | Herman | G06Q 20/209 |
| | | | 705/39 |
| 2016/0117689 A1* | 4/2016 | Oshry | G06Q 30/0201 |
| | | | 705/7.29 |

* cited by examiner

COMPUTERIZED-METHODS AND SYSTEMS FOR IDENTIFYING DUPLICATE ENTRIES IN A DATABASE OF MERCHANT DATA

FIELD

The present disclosure generally relates to systems and methods for use in identifying duplicate, obsolete, or otherwise errant data related to merchants in transaction data, including, for example, names of merchants, locations of merchants, etc., through use of localized knowledge from individuals in the vicinity of the merchants and crowdsourcing techniques for accessing such localized knowledge.

BACKGROUND

This section provides background information related to the present disclosure which is not necessarily prior art.

Merchants often offer products (e.g., goods and services, etc.) for sale to consumers. The products may be purchased through a variety of means, including, for example, payment accounts. As part of product purchases via payment accounts, data is transferred between different entities to authorize, settle, and/or clear the transactions, i.e., as transaction data. In connection therewith, the transaction data is often stored by one or more of the different entities, and subsequently used, for a variety of purposes, including marketing, etc. Extracting data, however, from these entities may be hindered by dissimilar and/or errant entries for certain aspects of the data related to the same merchant. For example, when an errant merchant name and/or location is associated with a point of sale (POS) terminal, transactions authorized at that terminal may include an errant merchant name and/or location (e.g., Jim's Grocery Store at 123 Main Street may also exist in transaction data as Kim's Grocery at 123 Main St., etc.)

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers enter into transactions with merchants to purchase products (e.g., goods or services). Point-of-sale (POS) terminals are often used in the transactions. In processing the transactions, certain data about the merchants, and in particular merchant data that is appended to transaction data for the transactions, based on how the POS terminals are programmed or otherwise setup, may be missing, incomplete and/or inconsistent with merchant data at similarly situated POS terminals at the merchants, and/or inaccurate based on reuse of the POS terminals for different merchants or for the same merchants at different locations or based on reuse of the POS terminals or implementation of new POS terminals for the same merchants when new acquirers are used (and the POS terminals are programmed or reprogrammed) or based on merchants changing acquirers or acquirers changing information. For example, a merchant may have changed a store location in the time since an earlier transaction was processed, or a POS terminal may have been reprogrammed to reflect a generic corporate name and/or address that is different than a doing business as (DBA) name and/or location, for example, used in the transactions, or a merchant may have changed acquirers and reprogrammed a previously used POS terminal (with help from the new acquirer) in connection with the change. The systems and methods described herein make use of localized knowledge from individuals living in the vicinity of a specified merchant, through one or more crowdsourcing techniques, to verify merchant data (as appended to the transaction data), including, potentially, the merchant's DBA name, address, location, merchant category code (MCC), etc. In particular, individuals in the vicinity of the specified merchant are identified, and close matching, and publically known, merchant data is provided to the individuals who then are able to identify which of the provided merchant data is accurate or correct (or most accurate or most correct). In this manner, merchant data relevant to merchants and their POS terminals may be verified, as necessary, through such crowdsourcing, thereby enabling payment networks to maintain current and accurate merchant data (and delete or consolidate duplicate data entries).

Figure 1:
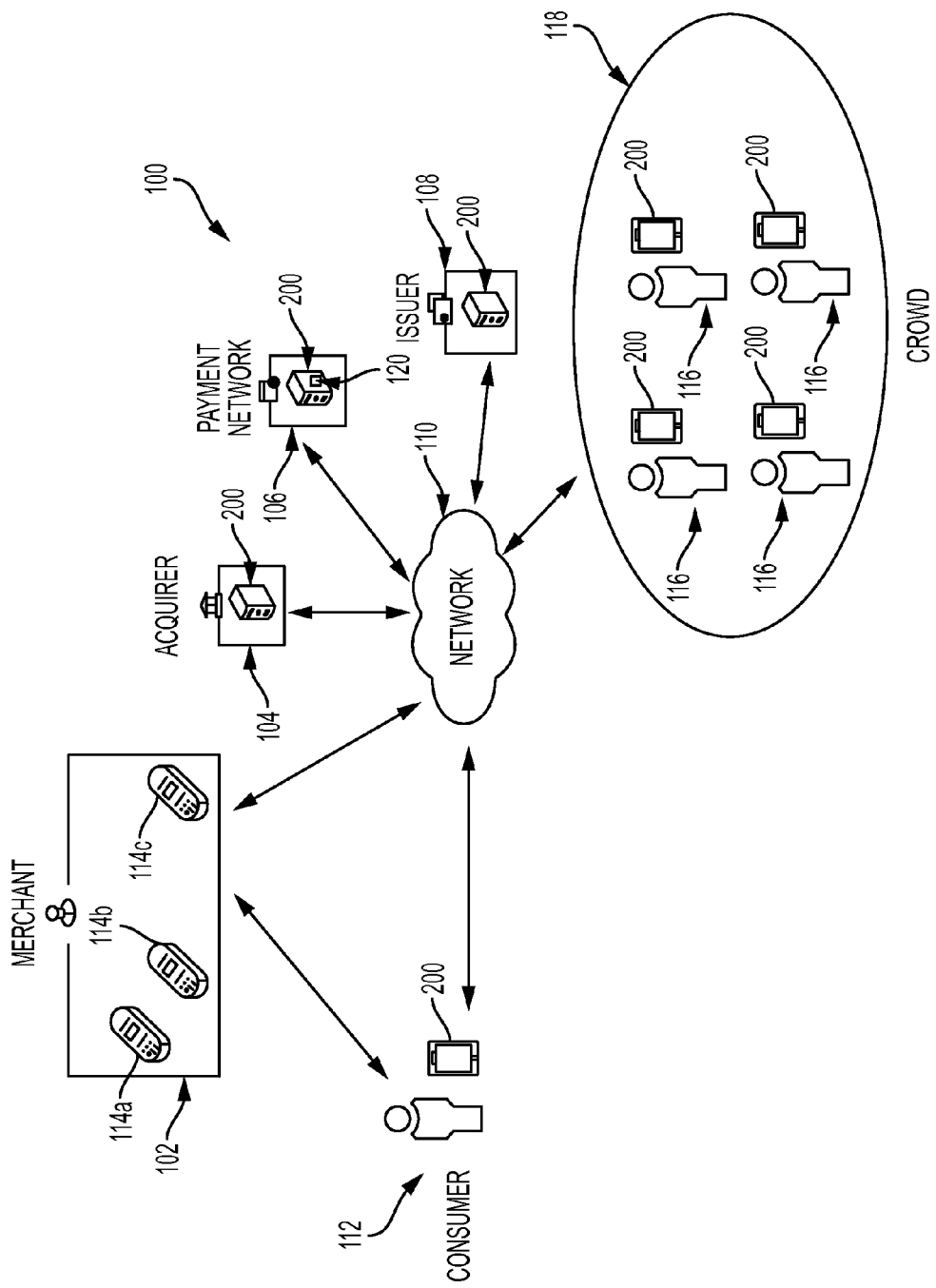
FIG. 1 is a block diagram of an exemplary system of the present disclosure suitable for use in verifying merchant data, and specifically, for example, merchant and/or merchant terminal locations.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, for example, depending on processing of payment transactions, transmittal of location data, storage of transaction and/or location data, crowdsourcing processes, etc.

As shown in FIG. 1, the illustrated system 100 generally includes a merchant 102, an acquirer 104, a payment network 106, and an issuer 108, each coupled to network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the network 110 may include a private payment transaction network made accessible by the payment network 106 to the acquirer 104 and the issuer 108 and, separately, a network through which the merchant 102 and consumer 112 may communicate (e.g., via a website or web-based application provided by the merchant 102, the issuer 108, etc.).

The illustrated merchant 102 is associated with a merchant ID that is unique to the merchant 102 (e.g., by the payment network 106, etc.). In addition, the illustrated merchant 102 includes three different POS terminals 114a-c used to complete transactions by consumers (e.g., by consumer 112, etc.). The POS terminals 114a-c are generally programmed (e.g., by the merchant 102, the acquirer 104 associated with the merchant 102, a third party, etc.) to include certain information about the merchant 102, including, for example, a merchant name (e.g., a DBA name or short DBA name, etc.), the merchant ID, a merchant location/address, a MCC, etc. In addition, the POS terminals 114a-c are programmed with terminal identifiers or terminal IDs (e.g., by the merchant 102, etc.), used by the merchant 102, for example, to identify the POS terminals 114a-c and the various transactions completed at the POS terminals 114a-c. In some embodiments, each of the POS terminals 114a-c may be configured with a unique, different terminal ID so that that terminals 114a-c can be distinguished from each other. In other embodiments, each of the POS terminals 114a-c, being located at the same location of the merchant 102, may be configured with the same terminal ID whereby transactions at the POS terminals 114a-c may only be identifiable, in general, to the merchant 102 (or the particular location of the merchant 102 illustrated in FIG. 1, or to a more general location of a headquarters of the merchant 102). In further embodiments, POS terminals at different locations of the merchant 102 (not shown) may be configured with the same terminal ID as the POS terminals 114a-c, or with unique different terminal IDs (ideally, however, different locations of the merchant 102 will have different merchant IDs).

When transactions are completed at the merchant 102, the merchant ID for the merchant 102 and the terminal IDs for the POS terminals 114a-c used in the transactions, are included in transaction data for the transactions. In this manner, the transactions can later be tracked generally back to the particular POS terminals 114a-c, and/or the merchant 102, at which the transactions occurred. While the merchant 102, and therefore the POS terminals 114a-c, are generally static or immobile in the system 100, it should be understood that, in some instances, the merchant 102 and/or other merchants (not shown) may employ POS terminals that are not static (or are mobile), i.e., the merchant 102 may move one or more of the POS terminals 114a-c from the current merchant location to a different location (or to a different merchant all together). As should be apparent, when this occurs, if the POS terminals 114a-c are not re-programmed when moved to the different location, the transaction data generated by the POS terminals 114a-c may be inconsistent, errant, and/or inaccurate.

With continued reference to FIG. 1, the system 100 also includes multiple users 116, forming a crowd 118. As will be described, the users 116 include individuals that provide crowdsourced feedback in connection with the system 100 and method 300 herein.

Some of the users 116 forming the crowd 118 may include users 116 who have registered for one or more services provided by the payment network 106 such as, for example, an electronic wallet (e.g., MasterPass® application, etc.), bill pay services, mobile account access services, etc. As such, each of these users 116 is associated with one or more communication devices, often portable communication devices (e.g., smartphone, cellular phones, tablets, etc.). Typically, the communication devices include one or more applications, which enable communication such as, for example, through electronic mail (email), instant messaging, short-message-service (SMS) messages, and/or other electronic messaging techniques. In particular, in one embodiment, the communication devices include an application, which permit the users 116 to access services offered by the payment network 106, and also permit, via user permission, the payment network 106 (and, in particular, a verification engine 120 associated with the payment network 106, as described more below) to communicate with the users 116, for example, in connection with crowdsourcing processes described herein, etc.

Some of the users 116 forming the crowd 118 may also include users 116 who provide consent to participate in the crowdsourcing activities (i.e., they are not necessarily associated with any services provided by the payment network 106).

Figure 2:
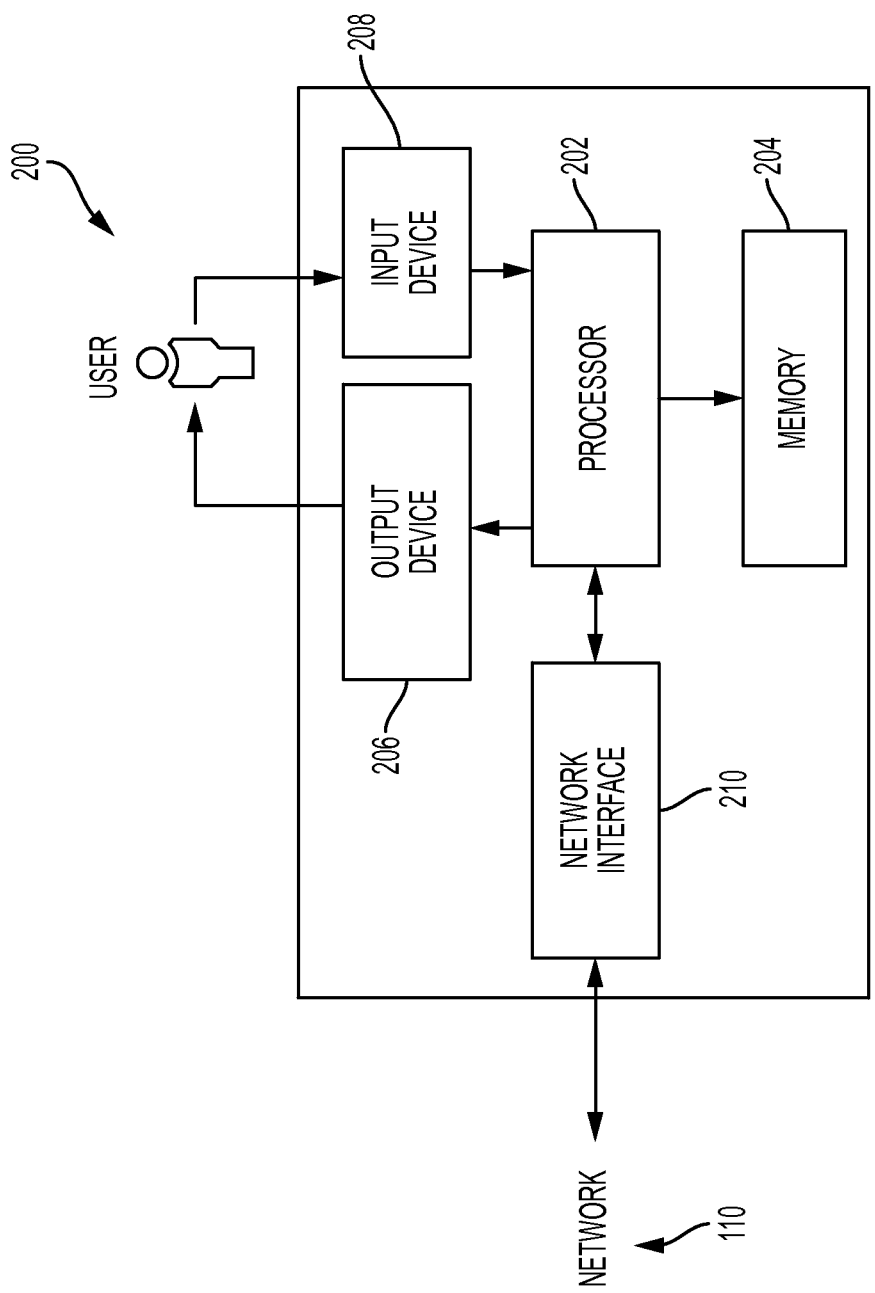
FIG. 2 is a block diagram of a computing device, that may be used in the exemplary system of FIG. 1.

FIG. 2 illustrates exemplary computing device 200, which is suitable for use in the system 100. By way of example (and without limitation), the exemplary computing device 200 may include one or more servers, workstations, personal computers, laptops, tablets, cellular phones, smartphones, POS terminals, combinations thereof, etc. as appropriate. In the system 100 (of FIG. 1), for example, the acquirer 104, the payment network 106, the issuer 108, the consumer 112, and the users 116 are each associated with, or implemented in, a computing device 200 coupled to (and in communication with) network 110 (the consumer's computing device 200 as well as the users' computing devices 200 may include portable communication devices such as smartphones, etc.). In addition, each of the POS terminals 114a-c in the system 100 is also consistent with the computing device 200. Further, while not shown, the merchant 102 may be associated with, or implemented in, a computing device, such as computing device 200, that is in communication with the POS terminals 114a-c. With that said, it should be appreciated that the system 100 is not limited to the computing device 200, as different computing devices and/or arrangements of computing devices may be used. It should also be appreciated that different components and/or arrangements of components may be used in other computing devices. Further, in various exemplary embodiments, the computing device 200 may include multiple computing devices located in close proximity, or distributed over a geographic region (such that each computing device 200 in the system 100 may represent multiple computing devices), so long as the computing devices are specifically configured to function as described herein.

As shown in FIG. 2, the illustrated computing device 200 generally includes a processor 202, and a memory 204 that is coupled to the processor 202. The processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, thumb drives, tapes, flash drives, hard disks, and/or any other type of volatile or nonvolatile physical or tangible computer-readable media. The memory 204 may be configured to store, without limitation, transaction data, merchant data, location data, terminal IDs, terminal key numbers, identified locations, and/or any other types of data discussed herein and/or suitable for use as described herein, etc. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

The illustrated computing device 200 also includes an output device 206 that is coupled to the processor 202. The output device 206 outputs, or presents, to a user of the computing device 200 (e.g., the consumer 112; the users 116; individuals associated with one or more of the merchant 102, the acquirer 104, the payment network 106, or the issuer 108 in the system 100; etc.) by, for example, displaying, audibilizing, and/or otherwise outputting information and/or data. It should be further appreciated that, in some embodiments, the output device 206 may comprise a display device such that various interfaces (e.g., applications, webpages, etc.) may be displayed at computing device 200, and in particular at the display device, to display such information and data, etc. With that said, output device 206 may include, without limitation, a liquid crystal display (LCD), a light-emitting diode (LED) display, an organic LED (OLED) display, an "electronic ink" display, speakers, combinations thereof, etc. In some embodiments, the output device 206 includes multiple units.

The computing device 200 further includes an input device 208 that receives input from the user of the computing device 200. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in some exemplary embodiments, a touch screen, such as that included in a tablet, a smartphone, or similar device, may behave as both an output device and an input device. In at least one exemplary embodiment, an output device and/or an input device are omitted from a computing device.

In addition, the illustrated computing device 200 includes a network interface 210 coupled to the processor 202 (and, in some embodiments, to the memory 204 as well). The network interface 210 may include, without limitation, a wired network adapter, a wireless network adapter, a mobile telecommunications adapter, or other device capable of communicating to one or more different networks, including the network 110. In some exemplary embodiments, the computing device 200 includes the processor 202 and one or more network interfaces incorporated into or with the processor 202.

In various embodiments herein, the input device 208 and/or the network interface 210 may include, among other things, a GPS antenna suitable to capture GPS signals for processing by the processor 202 to determine the location of the computing device 200 (e.g., in connection with the consumer's computing device 200, the users' computing devices 200, etc.). In addition (or alternatively), in various embodiments herein, the computing device 200 may rely on additional or other network signals, via network interface 210, to determine its location. With that said, it should be appreciated that any suitable operations to determine locations, by processors, based on GPS signals (or other network signals) may be used.

Referring again to FIG. 1, generally in the system 100, the merchant 102 offers one or various products for sale to the consumer 112. The consumer 112, to purchase a product, presents payment to the merchant 102. The payment may be provided in the form of cash or a check, or it may be provided through a payment account, etc.

When a payment account is used by the consumer 112 to purchase a product from the merchant 102, the merchant 102, the acquirer 104, the payment network 106, and the issuer 108 cooperate, in response to the consumer 112, to complete a payment account transaction (broadly, a purchase transaction) for the product using the consumer's payment account. As part of the purchase transaction, the consumer 112 initially provides information about the payment account (e.g., a payment account number (PAN), etc.) to the merchant 102 via a payment device (e.g., a payment card, a fob, a payment-enabled smartphone, etc.), or via login credentials for a previously established purchase account (e.g., an electronic wallet such as MasterPass™, Google Wallet™, Softcard®, etc.), etc.

In one particular purchase transaction, the merchant 102, via one of the POS terminals 114a-c, for example, POS terminal 114a in the following description, reads payment account information from the consumer 112 via a payment card and communicates, via the network 110, an authorization request to the payment network 106, via the acquirer 104 (associated with the merchant 102), to process the transaction (e.g., using the MasterCard® interchange, etc.). The authorization request includes various details of the transaction (e.g., a merchant name, location, and/or merchant ID for the merchant 102; a terminal ID for the POS terminal 114a; etc.) used to facilitate processing of the authorization request. The payment network 106, in turn, communicates the authorization request to the issuer 108 (associated with the consumer's payment account). The issuer 108 then provides an authorization response (e.g., authorizing or declining the request) to the payment network 106, which is provided back through the acquirer 104 to the merchant 102. The transaction with the consumer 112 is then completed, or not, by the merchant 102, depending on the authorization response. If the transaction is completed, the credit line or funds of the consumer 114, depending on the type of payment account, is then decreased by the amount of the purchase, and the charge is posted to the consumer's payment account. The purchase transaction is later cleared and settled by and between the merchant 102 and the acquirer 104 (in accordance with a settlement arrangement, etc.), and by and between the acquirer 104 and the issuer 108 (in accordance with another settlement arrangement, etc.).

Transaction data is generated as part of the above interactions among the merchant 102 (and POS terminal 114a), the acquirer 104, the payment network 106, the issuer 108, and the consumer 112. Depending on the particular transaction, the transaction data may include, without limitation, a primary account number (PAN) for the consumer's payment account involved in the transaction, a payment amount, an identifier for the product involved in the transaction, a description of the product involved in the transaction, a merchant ID for the merchant 102, a terminal ID for the POS terminal 114a, an acquirer ID for the acquirer 104, a merchant category code (MCC) assigned to the merchant 102 (e.g., by the payment network 110, etc.), a transaction entry mode (e.g., swipe, Internet order, Apple Pay™, etc.), a temporal indicator (e.g., a date/time stamp, etc.), merchant data such as a name (e.g., a DBA name, etc.) and location of the merchant 102 (e.g., an address indicated in a merchant profile in the POS terminal 114a, etc.), etc.

Once generated, the transaction data is stored in one or more different components of the system 100. In the illustrated embodiment, for example, the payment network 106 stores transaction data in memory 204 of the payment network computing device 200 (e.g., in a data structure associated with the memory 204, etc.). As such, the payment network 106 includes, in the memory 204 of the computing device 200, a compilation of transactions, associated with merchants (including merchant 102) and their corresponding locations, POS terminals (including POS terminals 114a-c) and their corresponding locations, and acquirers (including acquirer 104) involved in the various transactions processed by the payment network 106. It should be appreciated that transaction data may be collected and stored differently in other system embodiments, for example, at the merchant 102, the acquirer 104, and/or the issuer 108. Or transaction data may be transmitted between parts of the system 100, as used or needed. In addition, while the transaction data is described as stored in the payment network computing device 200, it should be appreciated that the transaction data could be stored apart from the memory 204 of the computing device 200 (e.g., in data structures associated with the payment network 106 but apart from the computing device 200, etc.) in various implementations. Further, the transaction data can be organized, accessed, culled, and/or correlated by various parts of the system 100 based on merchant ID, merchant name and/or merchant address (or based on other desired details), to perform one or more aspects of the transactions (e.g., clearing and/or settlement, etc.) and/or other operations reliant on transaction data.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers of the payment accounts, payment networks, etc. to use certain data (e.g., data related to transactions performed by the consumers; data not related to names and/or addresses of the consumers, etc.) collected during enrollment and/or collected in connection with processing the transactions, subsequently for one or more of the different purposes described herein.

With continued reference to FIG. 1, the illustrated system 100 further includes a verification engine 120, associated with the payment network 106. While the verification engine 120 is shown in FIG. 1 as associated with the computing device 200 of the payment network 106, it may be separate therefrom in other embodiments (e.g., the verification engine 120 may be implemented in its own computing device 200, etc.). Further, in other embodiments, the verification engine 120 may be associated with other parts of the system 100 shown in FIG. 1 (e.g., the issuer 108, the acquirer 104, etc.), or not shown, or it may be a stand-alone entity separate from other parts of the system 100 and configured to communicate therewith via the network 110, for example. Moreover, the verification engine 120 may comprise a single engine or multiple engines in various embodiments.

In general, the verification engine 120 is specifically configured, often by computer-executable instructions, to perform one or more of the operations described herein, for example, in connection with identifying duplicate locations for the merchant 102 (in merchant data stored in the payment network 106, for example), and thereby verifying the merchant data for the merchant 102, using crowdsourcing processes.

As an example, the POS terminals 114a-c associated with the merchant 102 may (but not in all cases) each be programmed with different merchant data (e.g., unintentionally, etc.). As such, transactions completed at each of the POS terminals 114a-c, even though being done at the same merchant 102, may present transaction data to the payment network 106 that appears to come from three different merchants, i.e., from three different close-match merchants to the merchant 102. The verification engine 120 is configured to identify that the three POS terminals 114a-c, even though having different merchant data, are in fact all associated with the merchant 102. As another example, each of the POS terminals 114a-c may be associated with a different acquirer (although, generally, each of the POS terminals 114a-c will typically be associated with the same acquirer, for example, the acquirer 104 in system 100). In this example, when the POS terminals 114a-c are each associated with a different acquirer, the verification engine 120 is configured to identify that the three POS terminals 114a-c, even though having different acquirers, are in fact all associated with the merchant 102. As a further example, when the merchant 102 changes acquirers, the POS terminals 114a-c may be reprogrammed. As such, new transaction data may appear to be from a new merchant 102 (resulting in a duplicate merchant location ID). In this further example, the verification engine 120 is configured to identify that the merchant 102 is the same, even though associated with a new acquirer.

As previously described, transaction data is stored for multiple purchase transactions involving the merchant 102 (and other merchants) and the POS terminals 114a-c (and other POS terminals) in memory 204 of the payment network's computing device 200. As such, the verification engine 120 can access particular transaction data in the memory 204 for the merchant 102 and for other merchants involved in transactions processed by the payment network 106. When correlating and/or otherwise processing purchase transactions, the payment network 106 may identify particular transactions that include merchant data (e.g., unverified merchant data, etc.) that is close to other merchant data in the transaction data stored in the memory 204. For example, the merchant name "Jim's Grocery Store" may be identified by the payment network 106 as being a close match to the merchant name "Jim's Groceries", when the corresponding addresses are the same (or are substantially similar). Such close matches are then identified in the payment network 106 (e.g., in a particular data structure in the memory 204 of the computing device 200, etc.), and accessed by the verification engine 120 as appropriate, for example, for audit, etc.

As an example, the merchant 102 may be identified for audit by the verification engine 120 for one or more various reasons (as discussed more below). As such, the verification engine 120 initially determines that the merchant 102 is associated with a master merchant location (broadly, a master merchant identifier) of "123 Main Street, City, State, 12345" in a particular data structure in memory 204 of the payment network's computing device 200.

In connection therewith, the payment network 106 may be configured to identify, from the transaction data, four merchants, Merchants 1-4, as having addresses that are close matches to the "master" merchant location of the merchant 102, and store merchant data for the Merchants 1-4 (as accessed from transaction data stored by the payment network 206) in the data structure (or in a different data structure). Table 1 illustrates the merchant data for the Merchants 1-4. Merchant data for Merchant 1 includes a correct DBA name (i.e., "Jim's Grocery Store") and a correct MCC (i.e., 9876), but the address is missing the state. Merchant data for Merchant 2 includes a misspelling of the DBA name, a misspelling of the street name in the merchant address, and is missing an indication of the city associated with the merchant address for Merchant 1. Merchant data for Merchant 3 is missing part of the DBA name and includes an incorrect street number for the address. And, merchant data for Merchant 4 includes an abbreviation for "street" in the address (instead of the word street), is missing an indication of the state associated with the merchant address, and includes an incorrect postal code.

TABLE 1

| Merchant Number | Merchant DBA Name | Merchant Address | MCC | Postal Code |
|---|---|---|---|---|
| 1 | Jim's Grocery Store | 123 Main Street, City | 9876 | 12345 |
| 2 | Gim's Grocery | 123 Nain Street, State | 9876 | 12345 |
| 3 | Jim's Grocery | 1123 Main Street, City, State | 9876 | 12345 |
| 4 | Jim's Grocery Store | 123 Maine St., City, State | 9876 | 12346 |

In other examples, merchant data other than merchant location/address (or other merchant data in combination with merchant location) may be used as a basis of comparison to master merchant identifiers for such data, as part of verifying such data for merchants. Such other data may include, for example, a merchant name, a MCC for a merchant, etc.

Once a set of different merchant data is identified for (or assigned to) the merchant 102 (by the payment network 106) for verification, for example, based on a master merchant identifier for such data (e.g., a location for the merchant 102, as in the above example; etc.), the verification engine 120 is configured to identify ones of the users 116 in the crowd 118 to help in verifying the merchant data.

The identified ones of the users 116 may include users 116 in the crowd 118 that are located within a geographic region (e.g., within 1 mile, within 5 miles, within 10 miles, within the same postal code, etc.) of the merchant 102 (as identified by the transaction data associated with the close-match merchants). In some embodiments, the verification engine 120 may be configured to select a distance according to population density of the surrounding area, such that the permitted distance from the merchant 102 is farther (e.g., 10 miles, 15 miles, 50 miles, etc.) in sparsely populated areas and shorter (e.g., 1 mile, 2 miles, 3 miles etc.) in more densely populated areas. As such, the identified users may be selected generally on the basis of their physical location in relative proximity to the merchant 102, for example, to the merchant's last known address, etc. The verification engine 120 may be further configured to base the selection on legal residence of the users, present physical location (as measured, for example, by GPS data sent from the user's computing device 200 using the IP-Address), a conversion of IP-Address to location data for users (e.g., by a third party, etc.), etc. In any case, it should be appreciated that the verification engine 120 generally is not configured to collect or save location data for consumers and/or users in connection with system 100 and/or method 300 herein.

Or, the verification engine 120 may be configured to identify ones of the users 116 in the crowd 118, based on whether or not the users have previously shopped at the merchant 102. When the verification engine 120 is configured to determine that one (or more) of the users 116 has shopped at the merchant 102, the verification engine 120 may further be configured to push a verification request, as described herein, to the user's communication device 200 shortly after he/she shops at the merchant 120 (with user consent, and as described more below).

The verification engine 120 is configured to then send queries to the identified ones of the users 118, including an indicator of the merchant 102 (e.g., a merchant name, a merchant address, etc.) for which data is to be verified and different merchant data (i.e., like merchant data or close-match merchant data) from different transactions that are believed to be associated with the merchant 102, and a request to verify the merchant data. In addition, the queries may optionally include validation questions for the users 118 (e.g., via Completely Automated Public Turing test to tell Computers and Humans Apart (CAPTCHA) methods, etc.), for which the answers are apparent, in order to verify that the responses are from the users 116 and are not automated. For the example above, the query may include a name of the merchant 102 for which data is to be verified, merchant data for Merchant 1 as "Jim's Grocery Store at 123 Main Street" and merchant data for Merchant 2 as "Jim's Grocery at 123 Main St.", with a request then to confirm that one, both, or neither of the close-match Merchants 1 and 2 are the same as merchant 102 (e.g., Jim's Grocery Store at 123 Main Street, City, State, 12345).

When the identified ones of the users 116 respond to the queries, the verification engine 120 is configured to receive the responses and, as necessary, to further query additional ones of the users 116 (or other users) in order to verify (or further verify) that the at least one of the close-match merchants is or is not actually the merchant 102. When the at least one of the close-match merchants is confirmed, the verification engine 120 is configured to associate the transaction data for the confirmed close-match merchant to the merchant 102 in the appropriate data structure. The verification engine 120 may be configured to then provide notification, as desired, to the merchant 102, the issuer 108 or other entity shown (or not shown) in the system 100 of the subsequent confirmation of the close-match merchant (and its associated merchant data for review/approval, etc.). Alternatively, when the close-match merchants are not confirmed, the verification engine 120 may be configured to flag the close-match merchant for further investigation by an administrator.

It should again be appreciated that close-match merchant data can be any data value chosen based on some level of proximity or similarity to the current database entry, e.g., if the current entry to be verified is an address, the close match merchant entry can be a nearby address, an address within one digit (e.g., in the street number of postal code, etc.) omitted or changed, or an address of a second merchant with a similar name to the confirmed merchant, etc. If the current entry to be verified is a merchant name, the close match merchant entry can be another name similar in pronunciation or significance, abbreviated (or not), etc. In certain embodiments, the verification engine 120 is configured to generate a query with at least two, three, four, or more merchant names and/or addresses to be verified.

Figure 3:
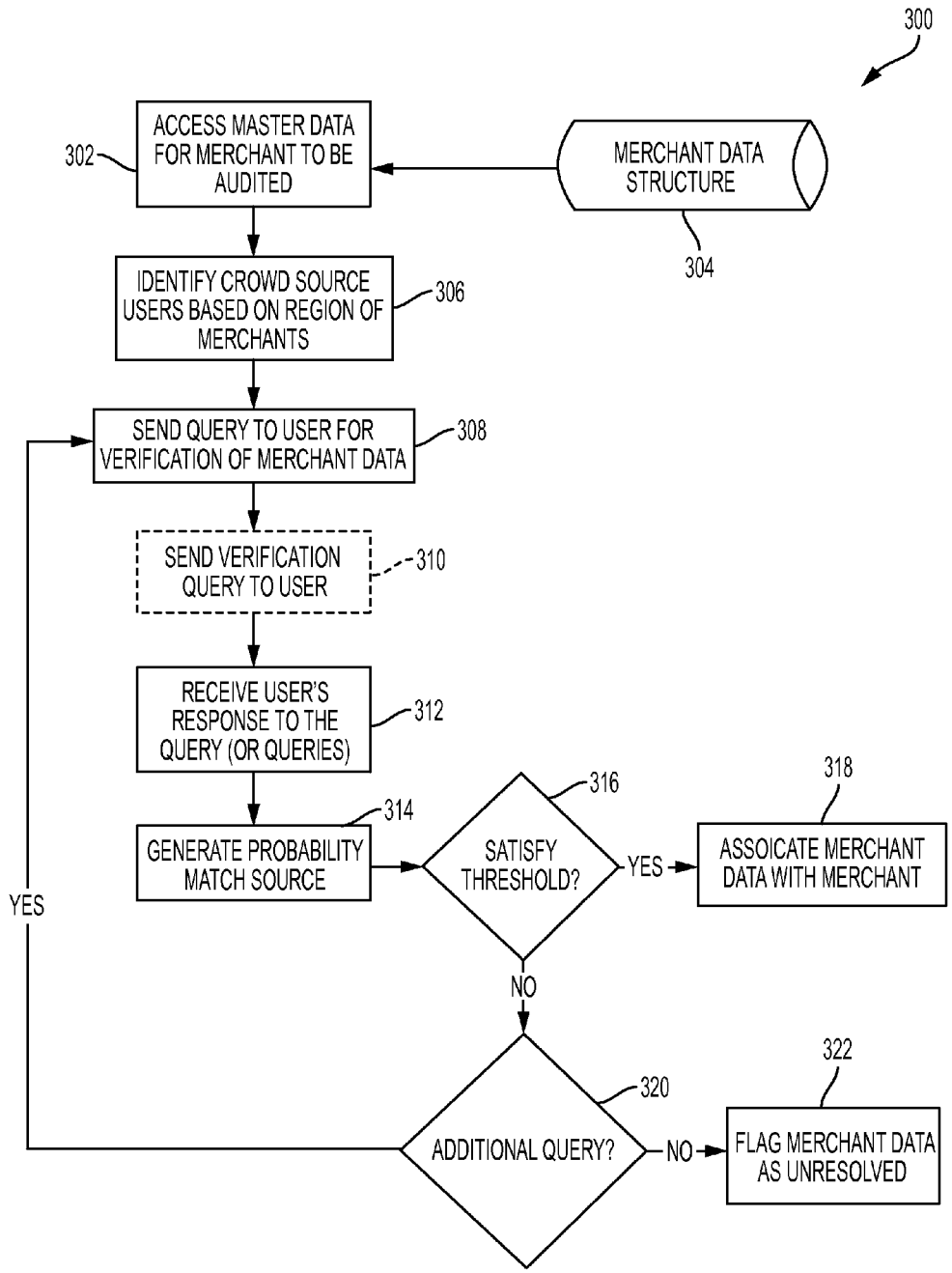
FIG. 3 is an exemplary method for verifying merchant data, that may be implemented in the system of FIG. 1.

FIG. 3 illustrates an exemplary method 300 for verifying merchant data and correlating (or associating) merchant data in transactions having differing merchant identifiers (e.g., different addresses, different DBA names, etc.). The exemplary method 300 is described as implemented in the verification engine 120, as part of the payment network 106 of the system 100. However, the method 300 is not limited to the verification engine 120, or to the payment network 106, and, as such, may be implemented in other parts of the system 100 or in other systems. Further, for purposes of illustration, the exemplary method 300 is described herein with reference to the computing device 200. But the methods herein should not be understood to be limited to the exemplary system 100 or the exemplary computing device 200, and the systems and the computing devices herein should not be understood to be limited to the exemplary method 300

As described above, when the POS terminals 114a-c in the system 100, for example POS terminal 114a in the following description, are programmed for use by the merchant 102 at initial installation, or when moved by the merchant 102, or when moved within or among different merchants and/or otherwise, the POS terminal 114a is programmed with certain merchant data for the merchant 102. The POS terminal 114a then incorporates the programmed merchant data into the transaction data included in authorization requests for payment account transactions completed at the POS terminal 114a. For purposes of illustration, merchant data is described in method 300 with reference to a merchant name (or DBA name) for the merchant 102 and a merchant location (or address) for the merchant 102. Other merchant data, however, may be employed in the methods herein.

As can be appreciated, when the POS terminal 114a is programmed with different merchant data than POS terminals 114b and 114c, the transaction data received from the merchant 102 (and particularly the merchant data associated therewith) will be inconsistent. Through one or more techniques, upon receiving the transaction data for a purchase transaction at the merchant 102, the payment network 106 identifies the merchant 102 as either a confirmed merchant (and identifies merchant data associated with the merchant as master merchant data) or a different merchant. In general, a confirmed merchant, based on one or more factors (e.g., total revenue, first-seen date, etc.) is confirmed to be the most prevalent name and/or location for the merchant 102 (and may then have its merchant data be associated with a master merchant data entry in a data structure in memory 204 of the payment network's computing device 200). A different merchant (as related to the confirmed merchant) is simply a merchant who is not the confirmed merchant, and may or may not be a match to the confirmed merchant.

For example, if merchant 102 includes a total of 37 POS terminals (including POS terminals 114a-c) with 36 of the POS terminals (including, for example, POS terminals 114a-b) programmed with a merchant address of "123 Main Street, City, State, 12346" and with one of the POS terminals (POS terminal 114c, for example) programmed with a merchant address of "123 Main Street, City, State, 12345," the transaction data would generally indicate two different merchant locations: one having the address of "123 Main Street, City, State, 12345" and one having the address of "123 Main Street, City, State, 12346." In this example, the merchant 102 is associated with a master merchant location of "123 Main Street, City, State, 12345" in a particular data structure in memory 204 of the payment network's computing device 200. As such, the payment network 106 clearly identifies the one POS terminal programmed with the same address as the master merchant location as being associated with the merchant 102. The payment network 106 then identifies the 36 POS terminals programmed with the address "123 Main Street, City, State, 12346" as close matches, because the address is close to the master merchant location and the corresponding transaction data is suspected as being transaction data from the merchant 102. The verification engine 120 can then operate, as described herein, to verify, or not, the close-match address. This example would also apply if the merchant 102 includes a single POS terminal, but the POS terminal is reprogrammed at some point with a different merchant address.

As shown in FIG. 3, at 302 in the method 300, the verification engine 120 initially accesses a data structure 304 (e.g., in memory 204 of the payment network's computing device 200, etc.) containing merchant data for the merchant 102 (e.g., a master merchant location for the merchant 102, etc.). The data structure 304 may also include merchant data for one, two, three, or more other merchants as well. In addition, other data structures containing merchant data for other merchants may be accessible to the verification engine, through the payment network 106, as desired.

It should be appreciated that not all merchants existing in memory 204 of the payment network's computing device 200 need to be processed, or audited, as described herein, to identify duplicate merchant locations or duplicate merchant data. In some embodiments, a scoring system may be used to identify the particular merchant(s) to be processed. In various implementations, the scoring system may be configured so that generally popular merchants are processed, for example, merchants whose daily transaction volume and/or transaction count is above a particular threshold (e.g., the top-k merchant locations satisfying a particular daily transaction volume and/or transaction count from a state/county/postal code, etc.). When such a scoring system is used, the merchants that are audited will likely be more popular in a geographic region, such that the merchants may be more known to the users 116 in the crowd 118 in that region and such that the crowdsourcing results discussed herein may be more accurate. In other embodiments, other factors may be used for selecting merchants for audit, such as a duration when transaction data for a merchant was last seen by the payment network 106 (e.g., if a merchant generally has high transaction counts/volume, but no transaction data has been seen in the last 30 days, the merchant may be audited; etc.), or if a merchant is part of a monitored aggregate merchant, etc. In any case, at least some of the merchants in the memory 204 may be audited to determine if any duplicate records for the merchants exist, and at least some may not.

Also in the method 300, the verification engine 120 determines a region of the merchant 102, based on the master location of the merchant 102, for example, and then identifies users (e.g., one or more of the users 116 from the crowd 118 in system 100, etc.), at 306, within the region of the merchant 102 (and/or within a region of a database entry to be verified). Typically, such users will know from first-hand experience whether a database entry is for the merchant 102 or not.

The region may be defined by a city, a postal code, a county, an area code, etc. In addition, in some embodiments the verification engine 120 selects the users to be no more than 10 miles, no more than 5 miles, no more than 3 miles, no more than 1 mile, or no more than 0.5 miles, etc. from the master location associated with the merchant 102 and/or an address associated with one (or more) of the close-match entries to be verified (i.e., the database entries that the verification engine 120 is auditing). The verification engine 120 may identify the users, or not, based on addresses associated with the users or, in some instances, with the users' permission, based on locations of the users' communication device 200. In any case, it should again be appreciated that neither the verification engine 120 nor the payment network 106 maintains or collects addresses of the users, either before selecting the users or after (e.g., selected users are not required to share address information with the verification engine 120 in connection with providing crowd-sourcing information herein, etc.). Often, the verification engine 120 attempts to identify a region sufficiently small so that the identified users will be familiar with the whole region or at least a major portion of the region. As such, a region in a densely populated area may be smaller, due to an increased density of merchants, while a region in a less populated area may be larger due to reduced density of merchants.

In some embodiments, the verification engine 120 may also (or alternatively) identify users, at 306, based on whether or not they shopped at the merchant 102 (or potentially at one or more other particular merchants).

Further, the users identified by the verification engine 120 may be registered to one or more services provided by the payment network 106, through which the users have agreed to participate in verification of merchant locations for merchants having addresses in the users' regions (although, as described above in connection with system 100, such association with the services of the payment network 106 is not required in all embodiments). In doing so, the users provide the payment network 106 with access to their communication devices 200. For example, a user may have a payment application on his or her smartphone, which permits the user to access payment network services to pay bills to merchants. The application, in this example, permits the verification engine 120 to communicate with the user as described herein. Alternatively, a user may have provided contact information to the verification engine 120 (e.g., a phone number, an email address, etc.), so that the verification engine 120 may then communicate with the user, again at the user's smartphone, via short-message-service (SMS) messages, electronic mail (email), or other electronic messaging techniques.

Next in the method 300, the verification engine 120 sends, at 308, a query to one (or multiple ones) of the identified users, to verify potential close-match merchant data for the merchant 102. The query may be sent to the user in a variety of manners. In the method 300, the verification engine 120 sends the query as an interface, which is displayed at the user's communication device 200. The interface may be presented to the user at login to a particular service or website associated with the payment network 206, or it may be displayed following an indicator or notification to the communication device 200, similar to a SMS message notification or new email notification. Alternatively, the verification engine 120 may send the query as a text or SMS message, whereby the interface is consistent with convention SMS interfaces, or may be accessed by a link in the SMS message, etc. It should be appreciated that these examples of how the query may be presented to the user are not intended to be exhaustive, and those of ordinary skill will be familiar with other manners in which the verification engine 120 may send a query to a user or cause it to be displayed at a communication device associated with the user.

The verification engine 120 also, optionally (as indicated by the dotted lines in FIG. 3), sends a verification request to the user, at 310, in connection with the query (together with the query or separately). The verification request generally includes a question, which is intended to be answerable by the user with minimal difficulty or based on common knowledge to verify that the response to the query is being provided by the user and is not an automated response. When a response to the verification request is incorrect, the verification engine 120 may either discard the user's response to the query or it may simply provide another verification request to the user. The verification request may be sent by the verification engine 120 at any desired time in connection with soliciting the query. For example, the verification engine 120 may send the verification request prior to the query (in a separate communication or interface) or at the same time as the query (in the same or separate interface), or even after sending the query. It should be appreciated that the verification request may include any suitable verification request and, in various embodiments, may be consistent with CAPTCHA methods, etc.

Figure 4:
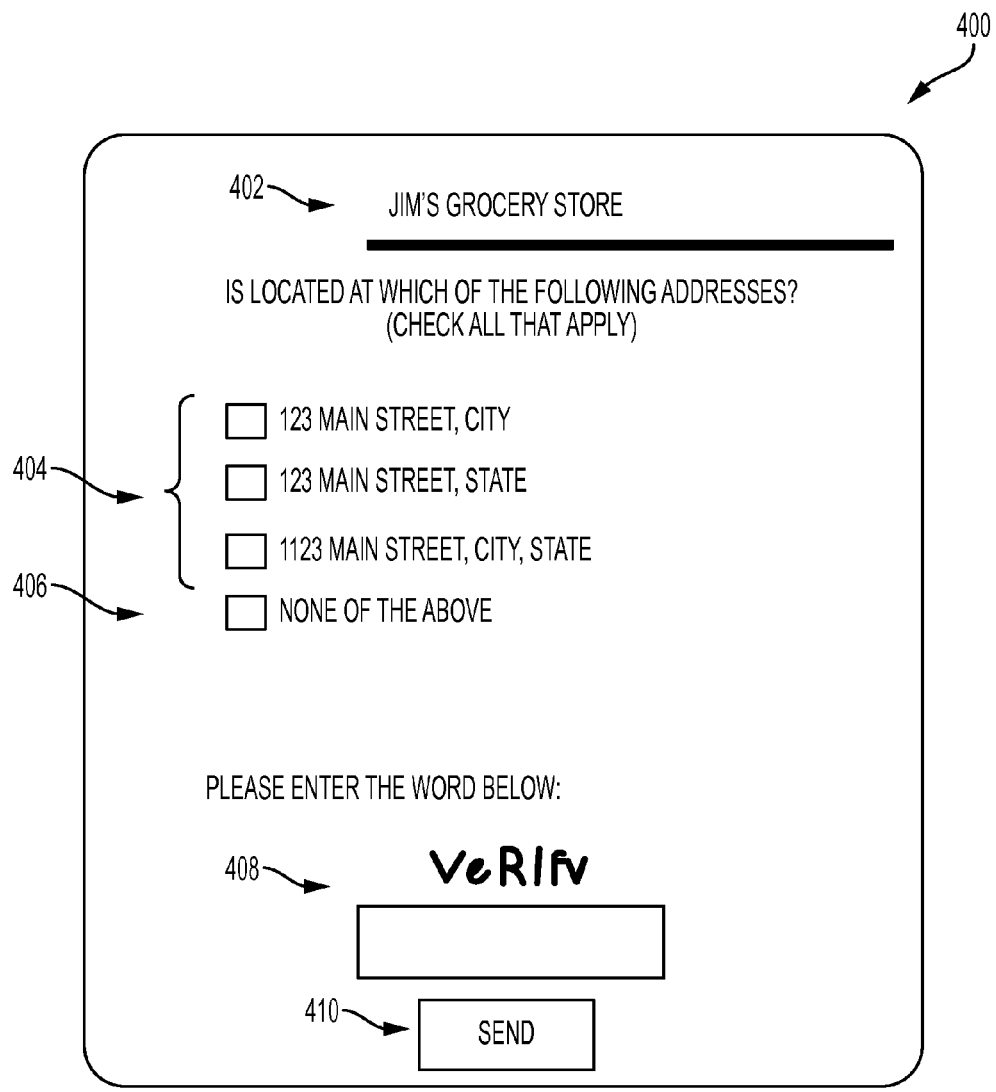
FIG. 4 illustrates an exemplary interface, which may be displayed to a user in connection with the system of FIG. 1 and/or the method of FIG. 3, to solicit verification of merchant data.

FIG. 4 illustrates an exemplary interface 400 that may be provided by the verification engine 120 to a user to query which of multiple different merchant locations, obtained from transaction data believed to be associated with the merchant 102, is actually a match to the merchant 102. As shown, the interface 400 includes a name 402 (e.g., a DBA name, etc.) for the merchant 102, i.e., "Jim's Grocery Store" from the example above, and three selectable addresses 404 (also from the example above), which may potentially be associated with the merchant 102. In response, the user is prompted to check all address options that match the name of the merchant 102, whereby the user may select one, two, or three of the addresses presented. Or, the user may select a "None of the Above" option 406 if the user believes none of the address options match the name of the merchant 102. The interface 400 also includes a verification request 408 included in the same interface 400 as the query. In this example, the verification request 408 prompts the user to enter/type a word or other grouping of letters/symbols based on a strange and/or non-text recognizable presentation thereof. Then, upon responding to the query and the verification request, the user can submit his/her response using button 410.

It should be appreciated that a different number of interfaces and/or interfaces having different formats may be used in other embodiments (e.g., other than interface 400, etc.). For example, other interfaces may identify more or fewer than three merchant locations to be verified. Or, instead of including just the name of the merchant 102 as a standard for comparison, other interfaces may include a master location (or address) of the merchant 102 (with or without the merchant's name) and may then list several names, that may be associated with the merchant 102, for the user to select (with or without corresponding addresses). Or further, other interfaces may include the name and/or address of the merchant 102 as the standard for comparison, and then list several industries and/or merchant categories for users to select as identifying the particular industry and/or category for the merchant 102 (e.g., to determine if the merchant 102 is a restaurant, grocery store, etc.). Moreover, verification requests other than illustrated in FIG. 4 may be used in some interfaces. For example, a verification request may include a math question (e.g., 3+2=?, etc.), a request to identify an object in an image, etc.

With continued reference to FIG. 3, after a query is transmitted to the user, the verification engine 120 receives the user's response to the query, at 312. The verification engine 120 may then store the response in memory 204 associated with the verification engine, or in the data structure 304, or otherwise.

Next, the verification engine 120 generates a probability match score based on, among other things, the received response, at 314, and compares the score to a predefined threshold, at 316. In so doing, the verification engine 120 makes a determination as to whether or not the identified response should be associated with the merchant 102. The probability match score may be calculated using an internal matching score (M) and a probability score (C) calculated based on user responses to the verification engine's query. The internal matching score generally represents how closely a merchant location matches a merchant taking into account, for example, one or more of merchant name, address, acquiring bank etc. The internal matching score is generally represented on a scale of between 0 and 1, with 1 being perfect match and 0 being completely mismatched. The probability score (C) represents the confidence that the responses from the users were not completely random, for example, following a Bernoulli probability distribution, etc.

As an example, and with reference again to the interface 400 in FIG. 4, an internal matching score (M) for each of the three addresses 404 may be 0.80, 0.70, and 0.60, respectively. The score for the "None of the Above" option 406 is then assigned a score of 1 minus the highest score of the three addresses 404, i.e., 1−0.80=0.20. In this example, queries are sent to three different users via the interface 400. In response, the first user votes for the first address in the interface 400, the second user votes for the third address in the interface 400, and the third user votes for the first address in the interface 400 (i.e., the votes for the three users are 1, 3, 1). As such, the verification engine 120 selects the first address, "123 Main Street, City" as the best candidate for matching the merchant 102 and generates a probability match score as follows.

Assuming the three users 116 in this example made their selections at random, for each of the users 116, the chance of the first address in the interface 400 being selected is one in four, or 0.25, and the chance of one of the other addresses or the "None of the Above" option being selected is three in four, or 0.75. As such, the probability of receiving the particular three user responses of 1,3,1, in this example, is, based on a binomial distribution:

$$\binom{3}{2} \times 0.25^2 \times 0.75 \approx 0.14$$

In other words, a probability (or confidence) score of C=1−0.14=0.86 exists that selection of the first address in the interface 400 (by the first and third users) was not obtained at random.

Then, using the probability score (C), weighted, in this example, by the number of responses obtained from the users (i.e., three), combined with the original internal matching score (M) for the first address (i.e., 0.80) and divided by one plus the number of responses obtained from the users, the verification engine 120 determines a probability match score for the first address in the interface 400 as follows:

$$\frac{M + 3*C}{1+3} = \frac{0.80 + 3*0.86}{4} = 0.845$$

Upon comparing the probability match score to a predefined threshold of 0.95 (e.g., as commonly selected by those skilled in the statistical art, or based on historical data for confirmed matches using these systems and methods herein, etc.), for example, the verification engine 120 determines that the threshold is not satisfied. In turn, the verification engine 120 either flags the first address in the interface 400 for further review, or the verification engine queries additional users (these options are described in more detail below).

As another example, and again with reference to the interface 400 in FIG. 4, an internal matching score (M) for each of the three addresses 404 may be 0.80, 0.70, and 0.60, respectively. The score for the "None of the Above" option 406 is then assigned a score of 1 minus the highest score of the three addresses 404, i.e., 1−0.80=0.20. In this example, queries are sent to four different users via the interface 400. In response, the first user votes for the second address in the interface 400, and the remaining three users vote for the "None of the Above" option in the interface 400 (i.e., the votes for the three users are 2, 4, 4, 4). In turn, the verification engine 120 selects the "None of the Above" option as the candidate and generates a probability match score as provided below.

Assuming, again, the four users in this example made their selections at random, for each of the users, the chance of the "None of the Above" option in the interface 400 being selected is one in four, or 0.25, and the chance one of the addresses being selected is three in four, or 0.75. As such, the probability of receiving the particular four user responses of 2, 4, 4, 4, in this example, is (again based on a binomial distribution):

$$\binom{4}{3} \times 0.25^3 \times 0.75 \approx 0.046$$

In other words, a probability (confidence) score of C=1−0.046=0.954 exists that selection of the "None of the Above" option (by the three users) was not obtained at random. Then, using the probability score (C), weighted, in this example, by the number of responses obtained from the users (i.e., four), combined with the original internal matching score (M) for the "None of the Above" option (i.e., 0.20) and divided by one plus the number of responses obtained from the users, the verification engine 120 determines a probability match score for the "None of the Above" option in the interface 400 as follows:

$$\frac{M + 4*C}{1+4} = \frac{0.20 + 4*0.954}{5} = 0.803$$

Again, upon comparing the probability match score to a predefined threshold of 0.95, for example, the verification engine 120 determines that the threshold is not satisfied. In turn, the verification engine 120 either flags the first address in the interface 400 for further review, or the verification engine queries additional users (these options are described in more detail below). As can be appreciated in this example, many more consistent votes for the "None of the Above" option will be needed to increase the resulting probability match score above the threshold of 0.95, because the internal determination (M) indicates that the "None of the Above" option in the interface 400 is less likely correct, i.e., at 0.20, than any of the available addresses.

In addition, in other examples, weights assigned to confidence scores (C) as well as internal matching scores (M) may vary and/or may be changed as needed or desired. Further, in other examples, other models can be applied (other than binomial distribution models, for example) to generate probability match scores.

With reference again to FIG. 3, in the method 300, when the probability score is above (or higher than) the predefined threshold (e.g., a threshold of 0.95 as in the above example, etc.) (thereby indicating a better match), the verification engine 120 marks the identified response as accepted and associates (or maps) the corresponding data (e.g., address, etc.) from the response with the merchant 102, at 318, for example, in the data structure 304 (e.g., the verification engine 120 updates a location designation value for the specified merchant 102 in the memory, etc.). Any duplicates for the identified address are then removed from the data structure 304.

However, when the probability score is equal to or below (or is less than) the predefined threshold, the verification engine 120 determines, at 320, whether or not additional queries should be sent to users in an effort to increase the probability score so that it satisfies the predetermined threshold (at which time the address identified in the response is accepted). In the method 300, this determination is based on whether or not a pre-specified maximum number of queries have already been sent (e.g., no more than 30 queries, no more than 50 queries, no more than 75 queries, no more than 100 queries, no more than 500 queries, etc.). If the pre-specified maximum number of queries has not yet been sent, the verification engine 120 sends one or more additional queries, at 308. In this manner, the probability match score may be updated, by the verification engine 120, as additional queries are sent and as corresponding responses are received, in an effort to accept the identified address (in an effort to get the probability score to satisfy the predefined threshold). But, if the pre-specified maximum number of queries has already been sent, and the predefined threshold is still not satisfied, the verification engine 120 flags the address as unresolved (or identifies it as pending), at 322, and provides the address to a third party for further investigation (and/or marks a location designation value for the specified merchant as unconfirmed in the memory 204).

In other embodiments, the determination of whether or not additional queries should be sent to users in an effort to increase the probability score so that it satisfies the predetermined threshold may be based on one or more other and/or additional factors. For example, if the response to the query is from a first user, such that only one response has been received, the verification engine 120 may determine that a second response is needed as a basis for comparison. Or, if multiple different (or inconsistent) responses have been received, the verification engine 120 may determine that additional queries are needed to provide additional results for comparison. As such, in these cases the verification engine 120 then sends another query to another user or multiple additional queries to multiple additional users, at 308. When the additional responses are received from the users, the verification engine 120 evaluates the responses to determine similarities (e.g., the verification engine 120 tallies the responses to determine which query choice has been selected by the most users, etc.). If the responses from the users are the same or a particular response is more prevalent, such that each of the responses indicates, for example, that a particular address is the same (or most likely the same) as the master location for the merchant 102 (or that another merchant data identifier is the same (or most likely the same) as the corresponding master identifier for the merchant 102), the responses are considered as being correct.

As can be appreciated, at least a certain number of users have to be queried by the verification engine 120 before the results/scores can be considered acceptable (e.g., before the results/scores potentially satisfy a predetermined threshold, etc.). For example, if four options are given such as in the interface 400 of FIG. 4, and the best internal matching score (M) among all the four options is 0.6, and a threshold for confirming a response is 0.95, then at least eight consistent responses from users (matching the available option with the highest internal matching score (M)) have to be received by the verification engine 120 in order to accept the results (i.e., number of responses=1, max possible score=0.675000; number of responses=2, max possible score=0.825000; number of responses=3, max possible score=0.888281; number of responses=4, max possible score=0.916875; number of responses=5, max possible score=0.932520; number of responses=6, max possible score=0.942648; number of responses=7, max possible score=0.949947; number of responses=8, max possible score=0.955542). Therefore, in these embodiments, the verification engine 120 will send the initial query to at least 8 users in order to get enough responses for the score to be considered acceptable.

As can also be appreciated, it is possible that a user may select one of the query choices based simply on a random guess. The random guess is not informative for purposes of confirming data accuracy. The verification engine 120 generally screens out such responses, based on misinformation or random guess, through use of the probability score.

The above examples and trends relating to the probability score may vary based on the types of merchants and/or the types of products offered for sale by the merchants, and as such, the assigned and/or updated scores for the merchants may vary further based on various factors, including merchant-specific factors. In addition, it should be appreciated that a variety of statistical methods known to those in the art may be employed, as described herein, to provides scores (indicative of confidence) and/or region/location analysis when, or if, the locations of the transactions vary. In addition, it is contemplated that the transaction data and/or location data used herein may be gathered over a period of time (e.g., two months, six months, one year, etc.). Thus, the trends described above may be based on one or more different periods of time. The periods of time may be variable, and, in numerous embodiments, may be limited to capture most recent data and/or to discard/ignore stale data or data beyond the period of time.

It should be appreciated that the functions described herein, in some embodiments, may be described in computer executable instructions stored on a computer readable medium, and executable by one or more processors. The computer readable medium is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware, or any combination or subset thereof, wherein the technical effect may be achieved by performing at least one of: (a) accessing a master merchant identifier for the merchant; (b) querying multiple users as to which of a list of merchant data entries for multiple different transactions corresponds to the master merchant identifier for the merchant, wherein the users are associated with a location within a predefined distance of the merchant and/or have performed one or more purchase transactions at the merchant; (c) receiving a response from at least one of the users, in which the at least one of the users selects a data entry from the list; (d) determining whether to proceed in querying additional users; and (e) calculating a score indicative of a probability that at least one of the data entries on the list corresponds accurately to the merchant, based on the responses from the at least one of the users, and either querying the additional users when the score fails to satisfy a predefined threshold or querying the additional users when desired to update the score.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps/operations may be employed.

When a feature is referred to as being "on," "engaged to," "connected to," "coupled to," "associated with," "in communication with," or "included with" another feature, it may be directly on, engaged, connected or coupled to, or associated, in communication, or included with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in verifying merchant data for a merchant, in connection with transaction data stored in a payment network, the method comprising:
    accessing a master merchant identifier for the merchant;
    querying, by a computing device, multiple users as to which of a list of merchant data entries included in transaction data for multiple different transactions corresponds to the master merchant identifier for the merchant, wherein the users are associated with a location within a predefined distance of the merchant and/or have performed one or more purchase transactions at the merchant;
    receiving, at the computing device, a response from at least one of the users, in which the at least one of the users selects a merchant data entry from the list;
    determining a score indicative of a probability that at least one of the merchant data entries on the list corresponds accurately to the merchant, based at least in part on the response from the at least one of the users; and
    querying one or more additional users as to which of the list of merchant data entries corresponds to the master merchant identifier for the merchant, when the determined score fails to satisfy a predefine threshold.

2. The computer-implemented method of claim 1, wherein querying the one or more additional users includes causing the master merchant identifier for the merchant to be displayed to the one or more additional users, along with the list of merchant data entries.

3. The computer-implemented method of claim 2, wherein the master merchant identifier for the merchant includes an address for the merchant and a name of the merchant.

4. The computer-implemented method of claim 3, wherein querying the one or more additional users includes querying the one or more additional users when a pre-specified maximum number of queries have not already been submitted to the multiple users.

5. The computer-implemented method of claim 2, further comprising:
    receiving, at the computing device, a response from at least one of the one or more additional users, in which the at least one of the one or more additional users selects a merchant data entry from the list; and
    calculating an updated score indicative of a probability that at least one of the data entries on the list corresponds accurately to the merchant, based at least in part on the response from the at least one of the users and a response received from the at least one of the one or more additional users.

6. The computer-implemented method of claim 5, wherein the updated score is calculated based on at least an internal matching score and the response received from the at least one of the one or more additional users.

7. The computer-implemented method of claim 5, further comprising updating a location designation value for the merchant in a database of merchant data when the score satisfies a score threshold.

8. The computer-implemented method of claim 5, wherein the method further comprises:
providing, by the computing device, verification questions to the multiple users and the one or more additional users; and
either:
discarding the responses from the multiple users and the one or more additional users when the users' responses to the verification questions are incorrect; or
providing, by the computing device, additional verification questions to the multiple users and the one or more additional users, when the users' responses to the verification questions are incorrect.

9. A system for use in identifying duplicate merchant locations in payment network transaction data, the system comprising:
a payment network including at least one processor coupled to a memory, the memory having a transaction data structure including transaction data for a plurality of transactions involving a plurality of merchants and at least one location identifier for each of the plurality of merchants, the at least one processor of the payment network configured to:
provide one or more services to users registered with the payment network, wherein the one or more services are network-accessible to each of the users; and
for each of the plurality of transactions in the transaction data structure:
receive an authorization request for the transaction from a merchant via an acquirer, the authorization request including a merchant location identifier for the merchant; and
store the merchant location identifier for the merchant in the transaction data structure as part of the transaction data for the transaction; and
a verification engine including at least one processor coupled to a memory, the memory of the verification engine including a merchant data structure comprising a master location for each of the plurality of merchants involved in the plurality of transactions in the transaction data structure, the at least one processor of the verification engine configured to:
identify a merchant of the plurality of merchants for audit;
determine, from the merchant data structure, the master location for the identified merchant for audit;
identify, from the plurality of merchants involved in the plurality of transactions in the transaction data structure, a plurality of close-match merchants for the identified merchant for audit, based on a similarity of the merchant location identifiers in the transaction data in the transaction data structure for each of the plurality of close-match merchants to the determined master location for the identified merchant for audit;
identify a plurality of the users registered with the payment network for crowd sourcing, based on at least one of: a location associated with the user being within a predefined distance from at least one of the merchant location identifiers for the identified plurality of close-match merchants, a location associated with the user being within a predefined distance from the determined master location for the identified merchant for audit, and/or the user having performed one or more purchase transactions at the identified merchant for audit;
query at least some of the identified plurality of users, in connection with a Completely Automated Public Turing test to tell Computers and Humans Apart (CAPTCHA), as to which of the merchant location identifiers for the identified plurality of close-match merchants is associated with the master location of the identified merchant for audit, thereby enabling the crowd sourcing in connection with verifying, by the CAPTCHA, that responses to the queries are not provided by automated computers;
receive responses from the queried users selecting ones of the merchant location identifiers for the identified plurality of close-match merchants as associated with the master location of the identified merchant for audit;
calculate a score indicative of a probability that at least one of the merchant location identifiers, for the identified plurality of close-match merchants, corresponds accurately to the determined master location of the identified merchant for audit, based on the responses from the queried users;
compare the calculated score to a threshold value,
when the calculated score satisfies the threshold value, update a location designation value for the identified merchant for audit in the merchant data structure;
when the calculated score does not satisfy the threshold value, query additional ones of the identified plurality of users, in connection with the CAPTCHA, as to which of the merchant location identifiers for the identified plurality of close-match merchants is associated with the master location of the identified merchant for audit;
receive responses from the queried additional users selecting ones of the merchant location identifiers for the identified plurality of close-match merchants as associated with the master location of the identified merchant for audit; and
update the score based on the responses from the queried additional users and, when the updated score satisfies the threshold value, update the location designation value for the identified merchant for audit in the merchant data structure.

10. The system of claim 9, wherein, in connection with calculating the score and/or updating the score, the at least one processor of the verification engine is configured to:
determine which merchant location identifier has been selected most often in the responses received from the queried users;
calculate a probability that the most selected merchant location identifier has achieved a most selected status by random chance; and
calculate the score based on the probability and an internal matching score for the responses received from the queried users.

11. The system of claim 10, wherein the at least one processor of the verification engine is further configured to mark the location designation value for the identified merchant for audit as unconfirmed in the merchant data structure, when the calculated score and the updated score do not satisfy the threshold value after a maximum allowed number of responses is received.

12. The system of claim 10, wherein the at least one processor of the verification engine is further configured to:
provide at least one verification question to each of the queried users and/or the queried additional users; and either:
for each of the queried users and/or the queried additional users, discard the response from the user when the response from the user to the at least one verification question is incorrect; or
for each of the queried users and/or the queried additional users, provide at least one additional verification question when the response from the user to the at least one verification question is incorrect.

13. The method of claim 1, wherein determining the score indicative of the probability that at least one of the merchant data entries on the list corresponds accurately to the merchant includes calculating a probability match score consistent with the following equation:

$$\frac{M + n \times c}{1 + n};$$

wherein n is equal to a number of responses received from the multiple users;

wherein M is an internal matching score representing how closely the at least one of the merchant data entries matches the merchant on a scale of between 0 and 1, with 1 being a perfect match and 0 being completely mismatched; and wherein C is a probability score representing a confidence that the response received from the at least one of the users is not random, the probability score calculated based on a binomial distribution.

* * * * *